Dec. 9, 1958 A. T. RIEDI 2,863,185
JOINT CONSTRUCTION INCLUDING A FASTENER FOR SECURING
TWO STRUCTURAL MEMBERS TOGETHER IN EDGE-TO-EDGE
CLOSELY ABUTTING RELATION
Filed Feb. 16, 1954
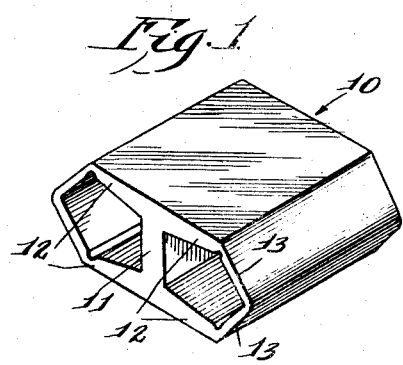
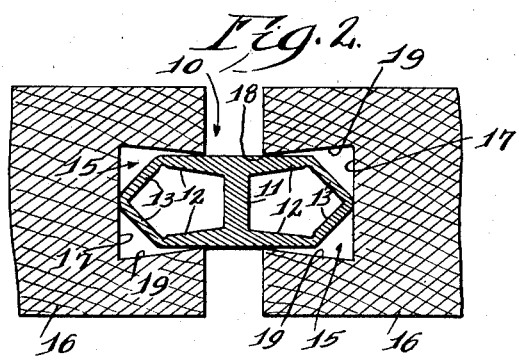
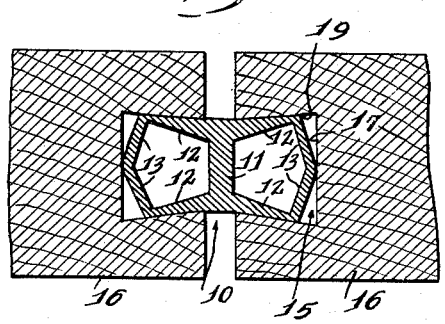
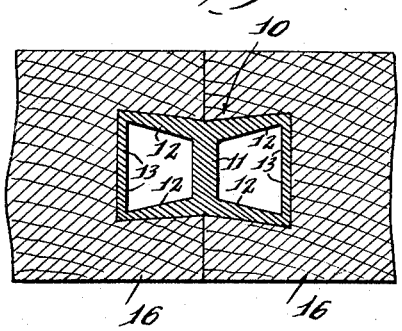
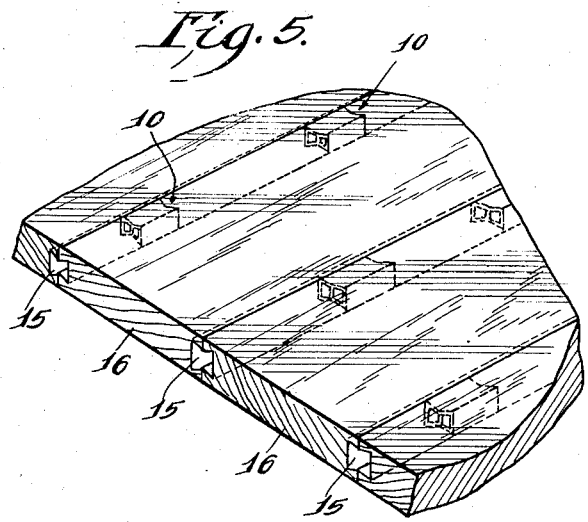
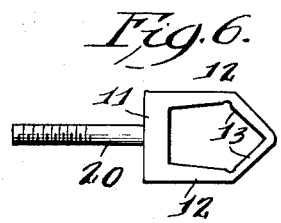
Inventor:
Arnold T. Riedi.
By. Carlson, Pitzner, Hubbard & Wolfe
Attorneys.

United States Patent Office 2,863,185
Patented Dec. 9, 1958

2,863,185

JOINT CONSTRUCTION INCLUDING A FASTENER FOR SECURING TWO STRUCTURAL MEMBERS TOGETHER IN EDGE-TO-EDGE CLOSELY ABUTTING RELATION

Arnold T. Riedi, Dubuque, Iowa

Application February 16, 1954, Serial No. 410,689

2 Claims. (Cl. 20—92)

The invention relates to a joint construction including a deformable type of fastener for securing a structural member or the like to another structural member.

The present application is a continuation in part of my abandoned copending application Serial No. 241,955, filed August 15, 1951.

One object of the invention is to provide a joint construction including a unitary fastener of the above general character which fastener is insertable through the narrow openings of an undercut or dovetail slot or groove in a structural member and is adapted to be deformed into locking engagement with the walls of the slot by application of pressure thereto in an axial direction.

Another object is to provide a fastener adapted to lock two structural members in intimate adjoining relation with each other while remaining wholly concealed within the members.

Still another object is to provide a fastener of the above character which effectively permits free circulation of air through the co-operating locking slots in the adjoining structural members.

A more specific object is to provide a joint construction including a deformable fastener of unitary character having no loose or separable parts required to be interfitted into each other and which might become lost or scattered before use.

It is also an object of the invention to provide a joint construction including a dependable and efficient deformable fastener which is simple in construction, easy to apply, and capable of being produced at low cost.

Other objects and advantages of the invention will become apparent from the following detailed description of the preferred embodiments illustrated in the accompanying drawings in which:

Figure 1 is a perspective view of a preferred form of fastener embodying the features of the invention.

Fig. 2 is a transverse sectional view through two slotted structural members with the fastener inserted therein preparatory to forming the joint and locking the structural members together.

Fig. 3 is a sectional view similar to Fig. 2 but showing the partially completed joint with the fastener in the initial stage of deformation as pressure is applied to force the two structural members together.

Fig. 4 is a sectional view similar to the preceding two figures showing the completed joint with the fastener in its final locked form.

Fig. 5 is a perspective view illustrating one use of the fastener for securing together in edge-to-edge relation a series of structural members, such as boards or the like, to form a floor, wall, panel or other composite structure.

Fig. 6 is an end view of a modified form of the fastener wherein one end only is equipped with a deformable structure for engagement with a locking slot.

While the invention is susceptible of various modifications and alternative constructions, there is shown in the drawings and will be herein described in detail a preferred embodiment and one simple modification thereof. It is to be understood, however, that it is not thereby intended to limit the invention to the particular forms disclosed but it is intended to cover all modifications and alternative constructions falling within the spirit and scope of the invention as defined in the appended claims.

The fastener 10 employed in the joint construction of the present invention and constituting the preferred embodiment of the said invention, comprises a hollow shell or body of the deformable material, such, for example, as a relatively soft metal or alloy. The body is constituted in the present instance of a relatively thick, rigid cross-member or web 11 with integral side wall members or panels 12 of substantial length extending from opposite sides of said cross member in spaced, normally, generally parallel relation and normally disposed at right angles to said cross members. The side wall members merge into or have integrally joined thereto end wall members comprising two sections 13—13 which converge inwardly toward each other and which are also integrally joined at their ends remote from the side wall members with the line of junction of each pair of sections 13—13 normally disposed beyond the side wall members at each end of said fastener 10. As will be seen by reference to Figs. 2–4 of the drawings, two sections 13—13 which constitute the end wall member at each end of the fastener, are dimensioned and angled with respect to the side wall members and to each other so that upon application of pressure at their junction, the two sections 13—13 will flatten out or move into an aligned position in a common plane transverse to the axis of the fastener and thus spread the adjoining ends of the side wall members apart. To facilitate such flattening, the side wall members may be formed with shallow weakening grooves 13' at their junctions with the end members. In the exemplary embodiment, the side wall members and end wall member organization is duplicated at each side of the cross member 11, thus providing two identical hollow shell locking structures in end-to-end relation. Viewed from the end, the fastener is thus substantially H-shaped with the side wall members 12 constituting leg members thereof.

The locking structures of the fastener are designed to coact with suitably shaped locking slots 15 in structural members 16 which may be of wood or any other preferred material and which are to be secured together in edge-to-edge closely abutting relation. The slots 15 are undercut, the preferred construction being a dovetail configuration presenting a base 17 substantially wider than the opening or mouth 18 of the slot. The side walls 19 of the slot thus diverge outwardly from the mouth towards the base of the slot.

It will be understood, of course, that the elements of the fastener are dimensioned in conformity with the dimensions of the slot in which they are to be used, or conversely the slots are cut to conform to the size of the fastener. Thus, the side wall members have a width (measured from the center of the cross member) approximately equal to the depth of the side walls 19 of the slot in which they are to fit. End wall members comprising the two sections 13—13 are dimensioned so that their combined width is approximately equal to the width of the base of the slot. The over-all thickness of the fastener before deformation is approximately the same as the width of the mouth 18 of the slot so that the fastener may be inserted therein. When initially inserted as shown in Fig. 2, it will be observed that the side wall members 12 terminate approximately midway of the slot and the tip portion of the fastener, defined by the junction of the two sections 13—13, engages the base 17 approximately at the center of the slot.

With the fastener inserted in the complemental slots of two adjoining structural members as shown in Fig. 2, application of pressure to the structural members tending to force them together into edge-to-edge closely abutting relation, causes a progressive deformation of the locking structures of the fastener as the sections 13—13 flatten out into aligned position. Thus, as shown in Fig. 3, the sections 13—13 will exert a toggle action on the ends of the side wall members 12 forcing them outwardly into engagement with the inclined walls 19 of the slot. The side wall members 12 of course slide along the walls 19 of the slot and, as the structural members 16 come into abutting engagement, the sections 13—13 move progressively into aligned position in a common plane lying flush against the base 17 of the slot. In other words, the application of pressure to the lines of junction of the sections 13—13 of the fastener in an axial direction changes the deformable locking structure of the fastener from its original pentagonal shape to a trapezoidal shape with the broad side lying at the base of the slot and the narrow side at the mouth of the slot. In this deformed condition, the sections 13—13 of the end wall members, being alined in a common plane, oppose substantial resistance to any inward movement of the side wall members and thus firmly lock the fastener to the associated structural members.

In the exemplary embodiment illustrated, the side wall members 12 are tapered slightly with their thickest portion adjacent the cross member 11. While this tapered construction is desirable to add strength and rigidity to the fastener, it will be appreciated that the side wall members may take other shapes.

The fastener 10 is particularly useful in assembling structural members, such as boards to form panels of relatively large area, such as floors, walls, etc. When employed for this purpose, the structural members are slotted at opposite edges as shown in Fig. 5. Fasteners 10 are then inserted in the slots at suitably spaced points and the structural members are then forced together by any suitable pressure-applying means. The fasteners are deformed in the slots as above described and thus rigidly and permanently connect the structural members in intimate edge-to-edge closely abutting relation. As the hollow shells on opposite sides of the cross member 11, members when deformed, provide open channels in the direction of the slot, free circulation of air through the slots is permitted. This is particularly advantageous in the case of floors and similar panels as it prevents accumulation of moisture and consequent warping of the composite structure.

In the modified form of the fastener shown in Fig. 6, the deformable structure comprising the side wall members 12 and the two sections 13—13 constituting the end wall member is provided at one side only of the cross member 11. Any other preferred type of connecting means may be provided at the other side of the cross member or alternatively that member may be welded, soldered or otherwise permanently fixed to a structural member or whatever type of device the fastener is to be used with. In the particular form shown, a threaded stud 20 is rigidly anchored to the cross member 11 for connection with an associated structural member or the like.

It will be apparent from the foregoing that the invention provides a joint construction including a deformable fastener of novel and advantageous construction. The fastener is adapted for insertion in undercut or dovetail slots in structural members and is deformable into locking engagement therewith by simple application of pressure to the structural members in a direction axially of the fastener. When applied, the fasteners are wholly concealed within the structural members and although they form a strong and rigid joint therebetween, they still permit free circulation of air through the slots in the members. The improved fasteners are of simple one-piece construction, having no loose parts that might become separated before use or require interfitting before application. The simple one-piece construction facilitates manufacture and keeps the cost low and the simplicity of their application materially reduces the cost of producing composite panels of wood or other material.

I claim as my invention:

1. A joint construction comprising two structural members secured together in edge-to-edge closely abutting relation, each of said members having along their abutting edges opposed, complemental, aligned, longitudinally-extending slots of dovetailed transverse cross section; and a unitary, double-ended fastener of deformable metal disposed within and extending between said slots, said fastener having its opposite end portions deformed in said slots into locking engagement with the base and side walls of each slot, said fastener being dimensioned in conformity with the dimensions of said slots and comprising a cross member of substantial length and of a width approximately equal to the width of the open mouths of said slots, a first pair of side wall members integral with said cross member at one side thereof, a second pair of side wall members integral with said cross member at the opposite side thereof, each of said side wall members being of a width substantially equal to the depth of the side walls of said slots and the side wall members of each pair extending from the cross member, prior to deformation of the fastener, in spaced, parallel relation to each other and disposed at right angles to said cross member, with the side wall members of one pair in alignment with the corresponding side wall members of the other pair at the opposite side of said cross member, each pair of said side wall members having their edges which are remote from said cross member connected by an end wall member comprising two sections of a combined width substantially equal to the width of the bases of said slots, said two sections having their edges remote from said side wall members integrally joined together and being disposed in angular relation to each other to converge inwardly towards each other with their line of junction disposed beyond the ends of the side wall members of each pair thereof, said cross member, said side wall members and said end wall members defining a pair of hollow shells on opposite sides of said cross member, which hollow shells, prior to deformation of the fastener, are of a width corresponding substantially to the width of the mouths of the slots, the angular relation between said two sections of each of said end wall members, prior to deformation of the fastener, enabling said sections, upon the application of pressure to said lines of junction as the two structural members are progressively forced together into edge-to-edge abutting relation and the lines of junction are forced into contact with the adjacent bases of the slots, to move progressively into aligned position and into flat engagement with the adjacent bases of the slots and to simultaneously spread apart the side wall members of each pair thereof into engagement with the side walls of each slot to thereby lock the fastener in said slots and to secure the structural members in edge-to-edge closely abutting relation.

2. A unitary deformable fastener of the class described comprising a body of deformable metal and including a cross member of substantial length, a first pair of side wall members integral with said cross member at one side thereof, a second pair of side wall members integral with said cross member at the opposite side thereof, each pair of side wall members extending from the cross member in spaced normally parallel relation to each other and normally disposed at right angles to said cross member, with the side wall members of one pair in alignment with the corresponding side wall members of the other pair at the opposite side of said cross member, each pair of side wall members having their edges which are remote from said cross member connected by an end wall member comprising two sections of a combined width greater than that of said cross member, said two sections having their edges remote from the side wall members integrally joined together and being initially disposed in angular relation to each other to converge inwardly towards each other with the line of junction normally disposed beyond the side wall members of each pair thereof, said cross member, said side wall members and said end wall members defining a pair of hollow shells at opposite sides of said cross member, which hollow shells are normally of a width corresponding substantially to that of said cross member, the initial angular relation between the two sections of each of said end wall members enabling said sections, upon the application of pressure to the outwardly-extending line of junction between the angularly disposed end wall sections at each end of the fastener and in a direction towards said cross member, to move into an aligned position and to simultaneously spread apart the side wall members of each pair thereof.

References Cited in the file of this patent

UNITED STATES PATENTS

| | | |
|---|---|---|
| 668,720 | Siegmund | Feb. 26, 1901 |
| 1,348,640 | Hachmann | Aug. 3, 1920 |
| 1,537,678 | Jensen | May 12, 1925 |
| 1,711,471 | Curran | Apr. 30, 1929 |
| 1,898,340 | Cole | Feb. 21, 1933 |
| 2,108,174 | Mays | Feb. 15, 1938 |
| 2,266,464 | Kraft | Dec. 16, 1941 |

FOREIGN PATENTS

| | | |
|---|---|---|
| 575,270 | Great Britain | Dec. 1, 1947 |